US00RE46542E

(19) United States
(12) Reissued Patent
Chambers et al.

(10) Patent Number: US RE46,542 E
(45) Date of Reissued Patent: Sep. 12, 2017

(54) BOTTLE CAP

(71) Applicant: Burt's Bees, Inc., Oakland, CA (US)

(72) Inventors: Kathryn Chambers, Alpharette, GA (US); Matthew King, Durham, NC (US); Julie Colon, Oakland, CA (US); Courtney Cloninger, Durham, NC (US); Robert Combs, Morrisville, NC (US)

(21) Appl. No.: 29/528,842

(22) Filed: Jun. 1, 2015

Related U.S. Patent Documents

Reissue of:
(64) Patent No.: Des. 674,696
Issued: Jan. 22, 2013
Appl. No.: 29/425,956
Filed: Jun. 28, 2012

(51) LOC (10) Cl. ..... 09-07
(52) U.S. Cl.
USPC ..... D9/452
(58) Field of Classification Search
USPC ..... D9/445, 452, 454, 529; D5/50–54; D7/392.1; D24/224; 220/200, 281, 288, 220/293, 376
CPC ..... B65D 1/00; B65D 1/02; B65D 1/0207; B65D 1/0223
See application file for complete search history.

(56) References Cited

U.S. PATENT DOCUMENTS

D25,617 S * 6/1896 Gaskill ..... D9/529
D264,438 S * 5/1982 Thompson ..... D9/529
D364,040 S * 11/1995 Suskind ..... D5/1
D386,410 S * 11/1997 Mahlmann ..... D9/445
D453,880 S * 2/2002 Cheynet ..... D5/47
D476,573 S * 7/2003 Diete ..... D9/529
D498,382 S * 11/2004 Davis ..... D7/300.1
D530,153 S * 10/2006 Karp ..... D7/510
7,345,616 B2 * 3/2008 Williams ..... 342/4
D567,094 S * 4/2008 Bickert ..... D9/529
D575,580 S * 8/2008 Germany ..... D7/392.1
D578,633 S * 10/2008 Schluter ..... D23/370
D590,713 S * 4/2009 Ray ..... D9/450
D607,741 S * 1/2010 Triolo ..... D9/553
D612,238 S * 3/2010 Moreau et al. ..... D9/452
D616,703 S * 6/2010 Joy ..... D7/507
D618,065 S * 6/2010 Joy ..... D7/607
D629,259 S * 12/2010 Joy ..... D7/607
D636,263 S * 4/2011 Phemster ..... D9/452
D643,090 S * 8/2011 Cumberland ..... D23/209
D643,508 S * 8/2011 Wilkinson ..... D23/209
(Continued)

*Primary Examiner* — Darlington Ly
(74) *Attorney, Agent, or Firm* — Ann Lee

(57) CLAIM

We claim the ornamental design for a *bottle* cap, as shown and described.

DESCRIPTION

FIG. 1 is a top perspective view of a *bottle* cap, showing our new design;
FIG. 2 is a top plan view thereof;
FIG. 3 is a bottom plan view thereof *with the container portion shown in phantom removed*;
FIG. 4 is a back side elevation view thereof;
FIG. 5 is a front side elevation view thereof;
FIG. 6 is a left side elevation view thereof; and,
FIG. 7 is a right side elevation view thereof.
The broken lines [in the drawing depict environmental subject matter only and form] *showing the container portion of the bottle is provided for the purposes of illustrating environmental structure and forms* no part of the claimed design.

1 Claim, 2 Drawing Sheets

Matter enclosed in heavy brackets [ ] appears in the original patent but forms no part of this reissue; matter printed in italics indicates the additions made by reissue.

(Amended)

(56) References Cited

U.S. PATENT DOCUMENTS

| | | | | | |
|---|---|---|---|---|---|
| D649,469 | S | * | 11/2011 | Fine | D9/551 |
| D662,008 | S | * | 6/2012 | Harshman | D11/146 |
| D662,355 | S | * | 6/2012 | Tyson | D7/396.6 |
| D674,696 | S | * | 1/2013 | Chambers | D9/445 |
| D676,748 | S | * | 2/2013 | Guillois | D9/445 |
| D691,418 | S | * | 10/2013 | Minton | D7/399 |
| D692,674 | S | * | 11/2013 | Clerici | D5/63 |
| D702,446 | S | * | 4/2014 | Boyle | D5/61 |
| D715,100 | S | * | 10/2014 | Eyal | D7/510 |
| D723,366 | S | * | 3/2015 | Lee | D9/434 |
| D727,102 | S | * | 4/2015 | Eyal | D7/510 |
| D738,220 | S | * | 9/2015 | Rohit | D9/553 |
| D740,491 | S | * | 10/2015 | Albertini | D28/76 |

* cited by examiner

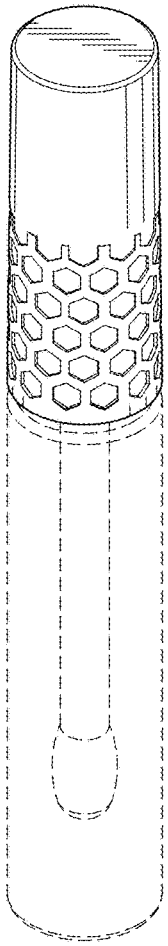
*FIG. 1*
(Amended)
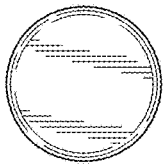
*FIG. 2*
(Amended)
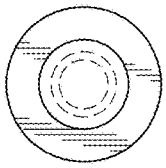
*FIG. 3*
(Amended)

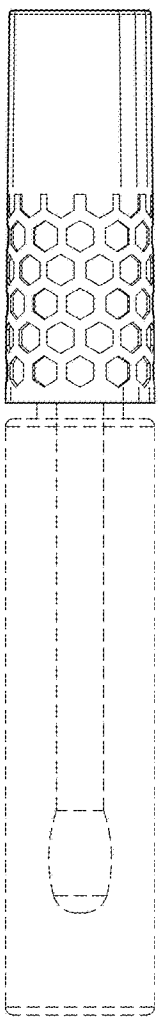
FIG. 7 (Amended)
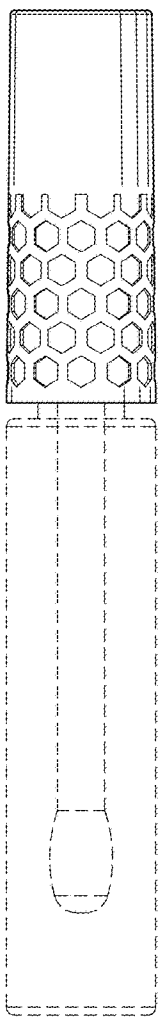
FIG. 6 (Amended)
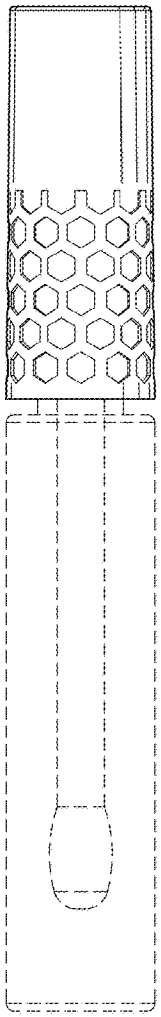
FIG. 5 (Amended)
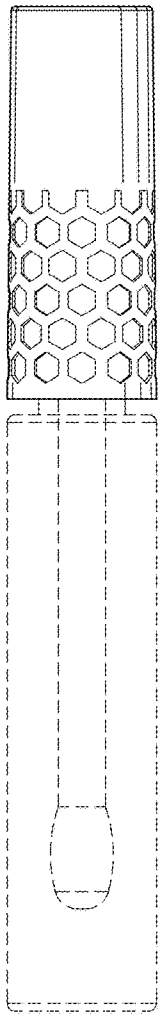
FIG. 4 (Amended)